(12) United States Patent
Dain

(10) Patent No.: US 9,884,971 B2
(45) Date of Patent: Feb. 6, 2018

(54) COMPOSITIONS AND METHODS FOR PROVIDING METALLIC AND REFLECTIVE QUALITIES TO AN OBJECT ILLUMINATED WITH ULTRAVIOLET LIGHT

(75) Inventor: Susan Dain, Montrose, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 1701 days.

(21) Appl. No.: 12/109,975

(22) Filed: Apr. 25, 2008

(65) Prior Publication Data
US 2009/0269518 A1     Oct. 29, 2009

(51) Int. Cl.
| | | |
|---|---|---|
| C04B 7/00 | (2006.01) | |
| C04B 9/12 | (2006.01) | |
| C04B 28/00 | (2006.01) | |
| C04B 28/04 | (2006.01) | |
| C09D 7/12 | (2006.01) | |
| C09D 5/33 | (2006.01) | |
| C09D 5/22 | (2006.01) | |
| C09D 5/38 | (2006.01) | |
| C08K 3/00 | (2006.01) | |
| C08K 3/08 | (2006.01) | |
| C08K 3/34 | (2006.01) | |

(52) U.S. Cl.
CPC ........... *C09D 7/1291* (2013.01); *C09D 5/004* (2013.01); *C09D 5/22* (2013.01); *C09D 5/38* (2013.01); *C08K 3/0033* (2013.01); *C08K 3/08* (2013.01); *C08K 3/34* (2013.01)

(58) Field of Classification Search
USPC ...................................................... 106/287.1
See application file for complete search history.

(56) References Cited

U.S. PATENT DOCUMENTS

| | | | | |
|---|---|---|---|---|
| 3,374,105 | A | * 3/1968 | Bolomey | ................. 106/417 |
| 4,400,162 | A | 8/1983 | Rustemis | |
| 5,236,621 | A | 8/1993 | DiPietro | |
| 5,571,624 | A | 11/1996 | Phillips et al. | |
| 5,759,671 | A | * 6/1998 | Tanaka et al. | ................. 428/166 |
| 5,780,124 | A | 7/1998 | Ripstein | |
| 5,863,459 | A | 1/1999 | Merchak et al. | |
| 5,866,994 | A | 2/1999 | Nakano | |
| 5,902,670 | A | 5/1999 | Ripstein | |
| 5,904,878 | A | 5/1999 | Merchak et al. | |

(Continued)

FOREIGN PATENT DOCUMENTS

| | | | | |
|---|---|---|---|---|
| WO | WO 3002674 A1 | * 1/2003 | ............... C09D 5/36 | |
| WO | WO 2004101890 A1 | * 11/2004 | | |

OTHER PUBLICATIONS

Nuosept™ 95 Preservative Material Safety Data Sheet.*
BASF Corporation Mearlin® Pearlescent Pigment. http://productfinder.basf.com/group/corporate/product-finder/en/brand/MEARLIN.*

*Primary Examiner* — Kaj K Olsen
*Assistant Examiner* — Ross J Christie
(74) *Attorney, Agent, or Firm* — Dorsey & Whitney LLP

(57) ABSTRACT

Compositions and methods related to providing an object with metallic and reflective qualities when illuminated with ultraviolet light are provided herein. Such compositions generally comprise reflective metal flakes and ultraviolet-luminescent pigments. Also provided are methods for making compositions comprising reflective metal flakes and ultraviolet-luminescent pigments and for applying a composition comprising reflective metal flakes and ultraviolet-luminescent pigments to an object.

20 Claims, 3 Drawing Sheets

(56) References Cited

U.S. PATENT DOCUMENTS

| | | | |
|---|---|---|---|
| 6,036,334 A | 3/2000 | Nakano | |
| 6,103,006 A | 8/2000 | DiPietro | |
| 6,489,393 B1 * | 12/2002 | Sitabkhan et al. | 524/588 |
| 6,565,770 B1 * | 5/2003 | Mayer et al. | 106/417 |
| 6,572,784 B1 * | 6/2003 | Coombs et al. | 106/417 |
| 6,692,830 B2 * | 2/2004 | Argoitia et al. | 428/403 |
| 6,749,777 B2 * | 6/2004 | Argoitia et al. | 428/323 |
| 6,997,982 B2 | 2/2006 | Pfaff et al. | |
| 7,064,309 B2 | 6/2006 | Wagoner et al. | |
| 7,268,180 B2 * | 9/2007 | Sitabkhan et al. | 524/588 |
| 7,310,139 B2 | 12/2007 | Takai et al. | |
| 7,338,877 B1 * | 3/2008 | Meyer et al. | 438/372 |
| 2001/0044012 A1 * | 11/2001 | Malhotra | 428/195 |
| 2002/0156181 A1 * | 10/2002 | Sitabkhan | C09D 7/001 524/588 |
| 2003/0083402 A1 * | 5/2003 | Okada et al. | 523/340 |
| 2003/0114562 A1 * | 6/2003 | Sitabkhan | C03C 17/006 524/261 |
| 2003/0176569 A1 * | 9/2003 | Tanzer | C09D 7/14 524/589 |
| 2004/0220298 A1 * | 11/2004 | Kozee et al. | 106/31.32 |
| 2006/0155146 A1 * | 7/2006 | Lenges | C07C 275/10 564/32 |
| 2007/0006127 A1 * | 1/2007 | Kuntz et al. | 717/104 |
| 2008/0078301 A1 * | 4/2008 | Pinzer et al. | 106/31.11 |
| 2008/0241371 A1 * | 10/2008 | Havelka et al. | 427/154 |

\* cited by examiner

COMPOSITIONS AND METHODS FOR PROVIDING METALLIC AND REFLECTIVE QUALITIES TO AN OBJECT ILLUMINATED WITH ULTRAVIOLET LIGHT

FIELD OF THE INVENTION

Disclosed herein are compositions and methods related to providing metallic and reflective qualities to an object illuminated with ultraviolet light.

BACKGROUND OF THE INVENTION

Some objectives of painting an object include providing metallic and reflective qualities to the object. Known methods of providing metallic and reflective effects to an object illuminated with incandescent light include dispersing reflective metal flakes throughout a medium, such as paint, which can be applied to the surface of the object. However, the ability to provide either or both metallic and reflective qualities to an object when the object is illuminated with ultraviolet light has proven to be difficult.

It will be recognized and appreciated by those skilled in the art that illumination of reflective metal flakes with ultraviolet light usually does not result in metallic and/or reflective qualities visible to the human eye. Further, an ordinarily skilled artisan will recognize that illumination of ultraviolet-luminescent pigments with ultraviolet light usually does not yield a reflective quality since the ultraviolet-luminescent pigments themselves are a source of visible light.

Accordingly, there is a need for compositions and methods for providing metallic and/or reflective qualities to an object illuminated with ultraviolet light.

SUMMARY OF THE INVENTION

The present invention relates to the combination of reflective metal flakes and ultraviolet-luminescent pigments into a composition, such as paint, which may be applied to an object to provide metallic and reflective qualities to the object when the object is illuminated with ultraviolet light. The metallic and reflective qualities of the compositions described herein, or an object painted with a composition described herein, are provided when visible light emitted from the ultraviolet-luminescent pigment(s) is reflected off the reflective metal flakes.

Accordingly, provided are methods of preparing a paint composition comprising mixing a first composition having reflective metal flakes with a second composition having ultraviolet-luminescent pigments, wherein the second composition is about 0.001% to about 1.0% by weight based on the total weight of the paint composition. In one embodiment, the second composition is about 0.01% by weight based on the total weight of the paint composition. In another embodiment, the second composition is about 0.04% by weight based on the total weight of the paint composition.

Also, described herein are compositions comprising reflective metal flakes and ultraviolet-luminescent pigments, wherein the reflective metal flakes reflect visible light emitted from either or both an incandescent light source or activated ultraviolet-luminescent pigments to provide the composition with metallic and reflective qualities. In some embodiments, a composition described herein comprises a water-based acrylic medium having reflective metal flakes and a water-based medium having ultraviolet-luminescent pigments, wherein the water-based medium having ultraviolet-luminescent pigments is about 0.001% to about 1.0% by weight based on the total weight of the composition. In one embodiment, the water-based medium having ultraviolet-luminescent pigments is about 0.01% by weight based on the total weight of the composition. In another embodiment, the water-based medium having ultraviolet-luminescent pigments is about 0.04% by weight based on the total weight of the composition. In another embodiment, the water-based medium having ultraviolet-luminescent pigments further comprises glycol ether and ethylene glycol.

In some compositions described herein, the reflective metal flakes include mica particles. In some embodiments, the ultraviolet-luminescent pigments are undetectable to the naked eye, e.g., may be clear. In other embodiments, when activated with ultraviolet light, the ultraviolet-luminescent pigments project visible light that is a color selected from the group consisting of yellow, green, red, blue, white, black, other colors, and combinations thereof. In another embodiment, the composition further comprises red iron oxide, aluminum, titanium dioxide, hydroxyethylcellulose, carbon black pigment, non-formaldehyde releasing preservative and surfactants.

Also described herein are methods for providing an object with metallic and reflective qualities when illuminated with ultraviolet light comprising applying to the object a composition including reflective metal flakes and ultraviolet-luminescent pigments, wherein the reflective metal flakes reflect visible light emitted from either or both an incandescent light source or activated ultraviolet-luminescent pigments to provide the object with metallic and reflective qualities. In some embodiments, the object is also provided with a glowing quality, which may be a color selected from the group consisting of yellow, green, red, blue, white, black, other colors, and combinations thereof. A glowing quality having a particular color may be provided via the use of ultraviolet-luminescent pigments that emit visible light having the particular color when activated with ultraviolet light. In some embodiments, the object is also provided with a high gloss finish via the application of a clear coat.

Accordingly, also provided herein are objects with metallic and reflective qualities when illuminated with ultraviolet light comprising a layer of reflective metal flakes and ultraviolet-luminescent pigments, wherein the reflective metal flakes reflect visible light emitted from either or both an incandescent light source or activated ultraviolet-luminescent pigments to provide the object with metallic and reflective qualities.

BRIEF DESCRIPTION OF THE DRAWINGS

The accompanying Figures, which are incorporated in and form a part of this specification, illustrate schematic representations by way of example and not by way of limitation. The Figures referred to in this specification should be understood as not being drawn to scale.

FIG. 1A is an enlarged representation, similar to FIG. 1, of reflective metal flakes reflecting visible light emitted from an external incandescent light source.

FIG. 2A is an enlarged representation, similar to FIG. 2, of reflective metal flakes reflecting visible light emitted from ultraviolet-luminescent pigments after the ultraviolet-luminescent pigments have been activated by ultraviolet light.

DETAILED DESCRIPTION OF THE INVENTION

The present invention relates to compositions, e.g., paint, having metallic and reflective qualities when illuminated by either or both incandescent light and ultraviolet light. The present invention also relates to providing an object with metallic and reflective qualities (e.g., a brilliant and lustrous appearance analogous to smooth polished metals with mirror-like effects) when illuminated by either or both incandescent light and ultraviolet light via application of such a composition.

Without being limited thereto, it is believed that the compositions described herein and objects painted with such compositions have metallic and reflective qualities under either or both incandescent light and ultraviolet light due to the combination of reflective metal flakes and ultraviolet-luminescent pigments in the composition. It is believed that the reflective metal flakes provide metallic and reflective qualities when the reflective metal flakes reflect visible light. As described in greater detail below, the visible light that is reflected off of the reflective metal flakes may be emitted from either or both external incandescent light sources and ultraviolet-luminescent pigments activated by ultraviolet light.

Figure 1:
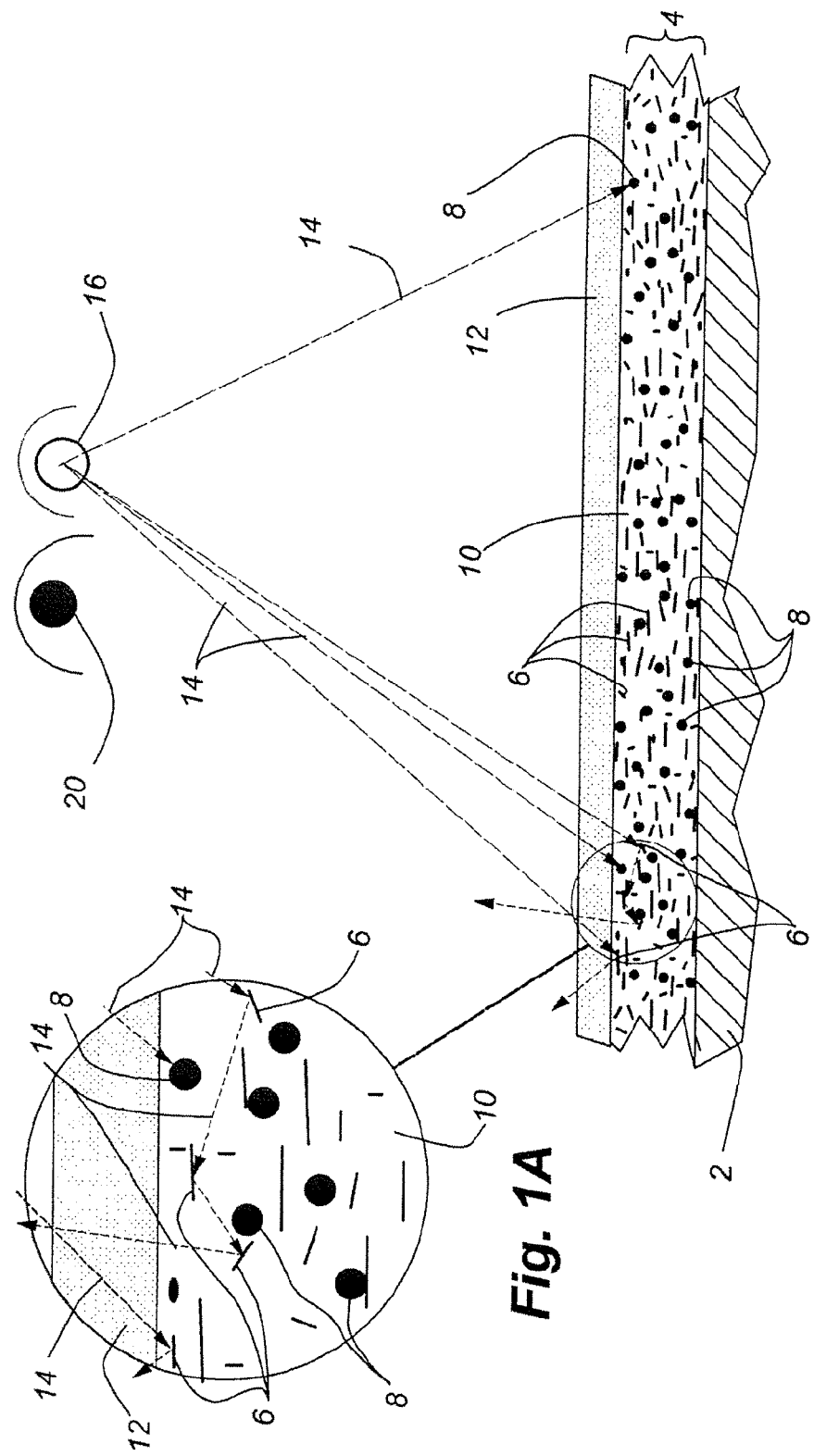
FIG. 1 is a schematic representation of a paint composition with reflective metal flakes reflecting visible light emitted from an external incandescent light source.
Figure 2:
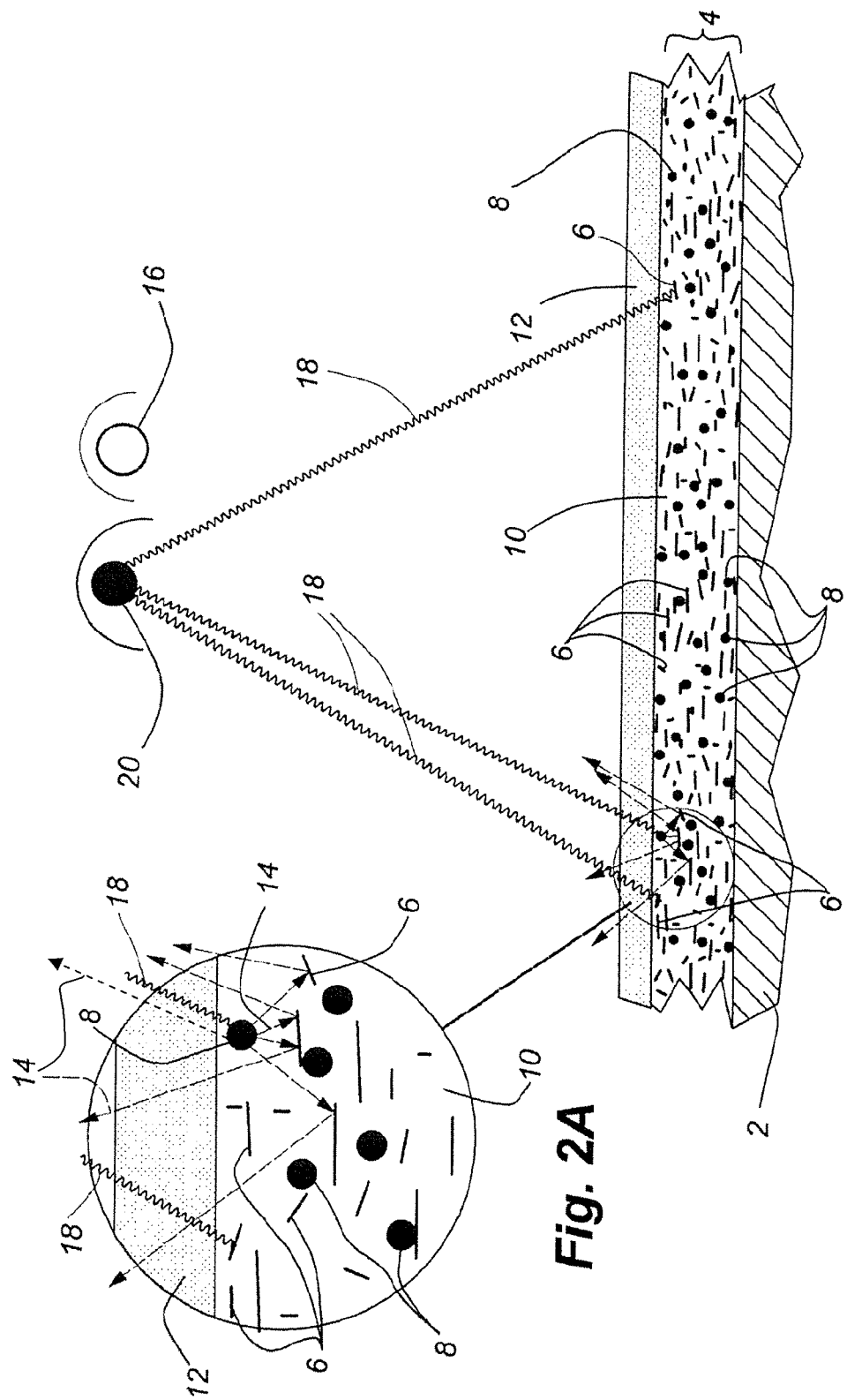
FIG. 2 is a schematic representation of a paint composition with reflective metal flakes reflecting visible light emitted from ultraviolet-luminescent pigments after the ultraviolet-luminescent pigments have been activated by ultraviolet light.
Figures 3, 3A:
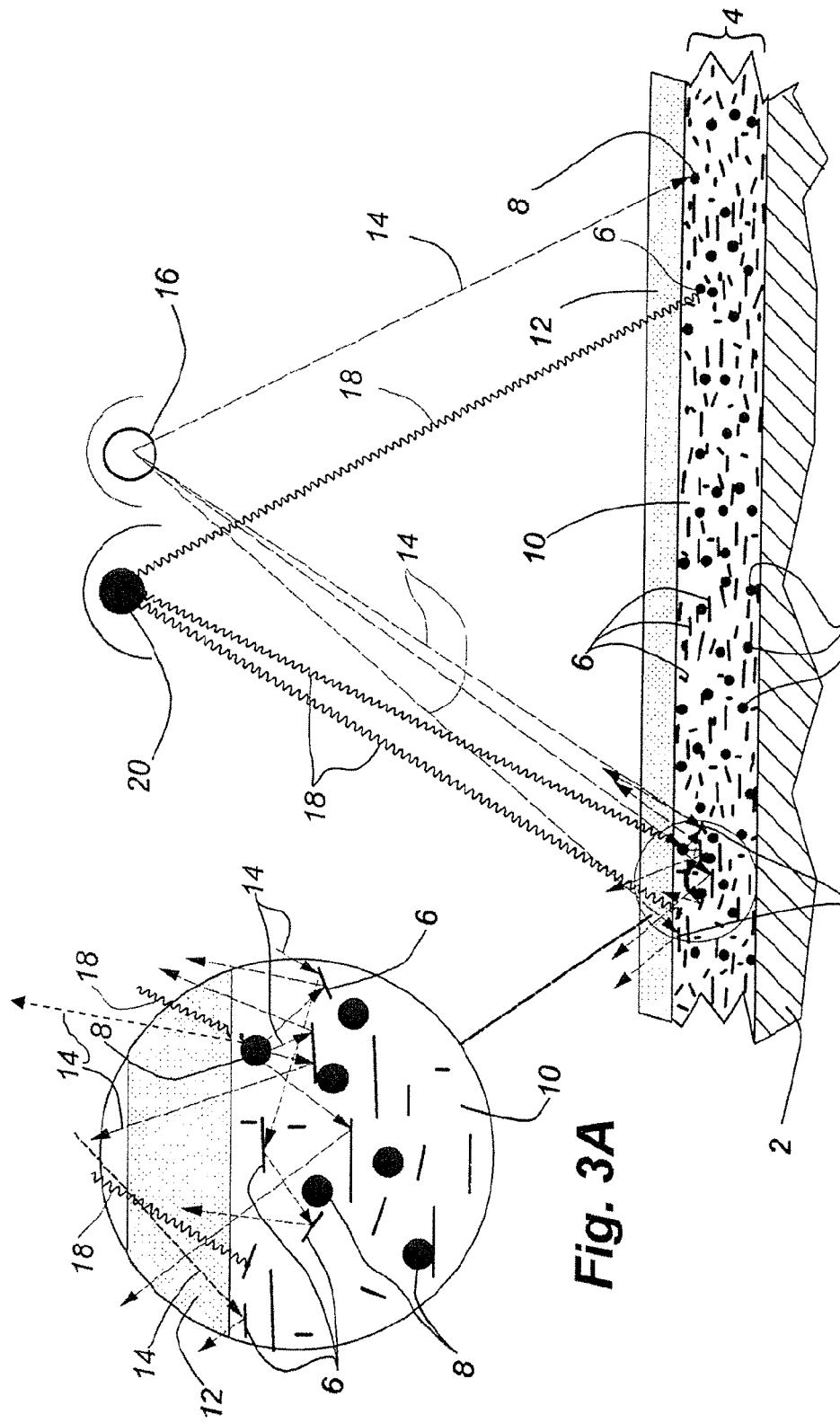
FIG. 3 is a schematic representation of a paint composition with reflective metal flakes reflecting both (1) visible light emitted from an external incandescent light source and (2) visible light emitted from ultraviolet-luminescent pigments after the ultraviolet-luminescent pigments have been activated by ultraviolet light.
FIG. 3A is an enlarged schematic representation, similar to FIG. 3, of reflective metal flakes reflecting both (1) visible light emitted from an external incandescent light source and (2) visible light emitted from ultraviolet-luminescent pigments after the ultraviolet-luminescent pigments have been activated by ultraviolet light.

Shown in FIGS. 1-3 are schematic representations of an object 2 covered with a paint layer 4 comprising reflective metal flakes 6 and ultraviolet-luminescent pigments 8 in a paint medium 10 and a clear coat layer 12 that provides a high gloss finish. Also shown in FIGS. 1-3 are the effects of illuminating the object 2 with either or both visible light 14 emitted from an external incandescent light 16 and ultraviolet light 18 emitted from an external light source 20, e.g., a black light.

Illuminating the paint layer 4 with visible light 14 emitted from an external incandescent light source 16 will provide the object 2 with metallic and reflective qualities. As represented in FIG. 1, it is believed that visible light 14 emitted from an external incandescent light source 16 will penetrate the clear coat layer 12 and illuminate the paint layer 4 that covers the object 2 with the paint medium 10, reflective metal flakes 6, and ultraviolet-luminescent pigments 8. Since the ultraviolet-luminescent pigments 8 are undetectable to the naked eye, it is believed that the visible light 14 projected onto the ultraviolet-luminescent pigments 8 will not provide any substantial effects detectable to the naked eye (FIGS. 1 and 1A). In contrast, metal flakes 6 will reflect at least some of any visible light 14 projected thereon. It is believed that the reflective metal flakes 6 will reflect some of the visible light 14 directly back through the clear coat layer 12 and/or to other reflective metal flakes 6, which will continue to reflect at least some of the reflected visible light 14 projected thereon (FIG. 1A). It is believed that the object 2 is provided metallic and reflective qualities when the reflective metal flakes 6 reflect some of the visible light 14 directly back through the clear coat layer 12. The object 2 may also be provided with metallic and reflective qualities when the visible light 14 is reflected between reflective metal flakes 6 and/or subsequently out of the clear coat layer 12.

Illuminating the paint layer 4 with ultraviolet light 18 emitted from an external source 20 will also provide the object 2 with metallic and reflective qualities. As represented in FIG. 2, when ultraviolet light 18, e.g., from an external ultraviolet light source 20, e.g., a black light, is used to illuminate the object 2, the ultraviolet light 18 will penetrate the clear coat layer 12 and illuminate the paint layer 4 that covers the object 2 with the paint medium 10, reflective metal flakes 6, and ultraviolet-luminescent pigments 8. It is believed that although the reflective metal flakes 6 may reflect ultraviolet light 18, the reflection of ultraviolet light will not provide the object 2 with metallic and reflective qualities detectable to the naked eye (FIGS. 2 and 2A). In contrast, the ultraviolet-luminescent pigments 8 will be activated by ultraviolet light 18 to emit visible light 14 that may have a particular color, e.g., yellow, green, red, blue, white, black, other colors, or combinations thereof. At least some of the visible light 14 emitted from activated ultraviolet-luminescent pigments may be projected directly out of the clear coat 12 and/or projected to reflective metal flakes 6 (FIG. 2A). It is believed that the reflective metal flakes 6 will reflect at least some of any visible light 14 that is emitted from the activated ultraviolet-luminescent pigments 8 and that is projected thereon. It is further believed that the reflective metal flakes 6 will reflect some of the visible light 14 that is emitted from the activated luminescent pigments 8 out through the clear coat layer 12 and/or to other reflective metal flakes 6, which will continue to reflect at least some of the reflected visible light 14 projected thereon (FIG. 2A). It is believed that the object 2 is provided metallic and reflective qualities when the reflective metal flakes 6 reflect some of the visible light 14 emitted from activated ultraviolet-luminescent pigments directly out through the clear coat layer 12. The object 2 may also be provided with metallic and reflective qualities when the visible light 14 emitted from the activated ultraviolet-luminescent pigments 8 is reflected between reflective metal flakes 6 and/or subsequently out of the clear coat layer 12. Further, it is believed that visible light 14 that is emitted from activated ultraviolet-luminescent pigments 6 and that is directly projected out of the clear coat 12 may provide the object 2 with a glowing quality that may have a particular color, e.g., yellow, green, red, blue, white, black, other colors, or combinations thereof.

Illuminating the paint layer 4 with visible light 14 emitted from an external incandescent light 16 simultaneously with ultraviolet light 18 from an external source 20 will also provide the object 2 with metallic and reflective qualities. As represented in FIG. 3, visible light 14 and ultraviolet light 18 emitted from an external sources 16, 20 will penetrate the clear coat layer 12 and illuminate the paint layer 4 that covers the object 2 with the paint medium 10, reflective metal flakes 6, and ultraviolet-luminescent pigments 8. In contrast to visible light 14, which will not activate the ultraviolet-luminescent pigments 8, ultraviolet light 18 will activate the ultraviolet-luminescent pigments 8, and cause them to emit visible light 14 that may have a particular color, e.g., yellow, green, red, blue, white, black, other colors, or combinations thereof. At least some of the visible light 14 emitted from activated ultraviolet-luminescent pigments may be projected directly out of the clear coat 12 and/or projected to reflective metal flakes 6 (FIG. 3A). The reflective metal flakes will reflect at least some of the visible light 14 that is emitted from the external incandescent light source 16 and/or from the activated ultraviolet-luminescent pigments 8, and that is projected thereon. It is further believed that the reflective metal flakes 6 will reflect some of the visible light 14 directly out through the clear coat layer 12 and/or to other reflective metal flakes 6, which will continue to reflect at least some of the reflected visible light 14 projected thereon (FIG. 3A). It is believed that the object 2 is provided metallic and reflective qualities when visible light 14 emitted from the external incandescent light source 16 and/or from the activated ultraviolet-luminescent pigments 8 is reflected by reflective metal flakes 6 directly out through the clear coat layer 12. The object 2 may also be provided with metallic and reflective qualities as visible light 14 is reflected between reflective metal flakes 6 and/or subsequently out of the clear coat layer 12. Further, it is believed that visible light 14 that is emitted from activated ultraviolet-luminescent pigments 6 and that is directly projected out of the clear coat 12 may provide the object 2 with a glowing quality that may have a particular color, e.g., yellow, green, red, blue, white, black, other colors, or combinations thereof.

Accordingly, described herein are compositions (e.g., dry powder compositions, paint compositions, etc.) comprising reflective metal flakes and ultraviolet-luminescent pigments, wherein the reflective metal flakes reflect visible light emitted from either or both an incandescent light source or activated ultraviolet-luminescent pigments to provide the composition with metallic and reflective qualities. Reflective metal flakes (i.e., reflective metal flakes and/or reflective metal-effect flakes) and ultraviolet-luminescent pigments, particularly those suitable for use in paint compositions, are well-known in the art. In particular, reflective metal flakes may be metallic and may be metal-effect flakes such as plastic, polyester, or other materials (herein referred to together as "metal flakes"). The ultraviolet-luminescent pigments suitable for use in the compositions described herein are generally undetectable to the naked eye, and may appear clear and/or colorless (e.g., white) in bulk powder form. Further, ultraviolet-luminescent pigments suitable for use in compositions described herein may be activated by ultraviolet light to emit visible light of a particular color, e.g., yellow, green, red, blue, white, black, other color, a combination thereof, etc.

For descriptive purposes only, the paint medium 10 in FIGS. 1-3 is shown as being relatively clear. However, a composition as described herein may comprise a paint medium that also comprises color pigments. The ways, and to what extent, in which visible light will be affected within a paint medium that also comprises color pigments are well-known. Accordingly, a composition described herein may comprise reflective metal flakes, ultraviolet-luminescent pigments, and color pigments, e.g., in a paint medium.

A composition described herein may be prepared by mixing together two or more compositions. For example, a first composition comprising reflective metal flakes may be combined with a second composition comprising ultraviolet-luminescent pigments. Paint compositions comprising reflective metal flakes are well-known in the art and include, but are not limited to, compositions such as Metallic Special FX Colors (AUTOAIR COLORS™, East Granby, Conn.), and METALLIC PAINT COLLECTION™ (MODERN MASTERS™, Sun Valley, Calif.). Paint compositions comprising ultraviolet-luminescent pigment, particularly ultraviolet-luminescent pigment that is undetectable to the naked eye, include but are not limited to, ClearColour (Rosco Laboratories, Inc, Stamford, Conn.) and Wildfire Luminescent Paints (Wildfire, Inc., Los Angeles, Calif.).

For explanatory purposes only, in FIGS. 1-3, the interaction of the visible light 14 and/or ultraviolet light 18 is depicted as occurring with the topmost reflective metal flakes 6 and ultraviolet-luminescent pigments 8 in the paint layer 4. Such depiction is meant to provide a diagrammatic, and not to scale, illustration of the concentrations of the reflective metal flakes and ultraviolet pigments of a composition described herein. The concentrations of the reflective metal flakes and ultraviolet-luminescent pigments should provide sufficient reflective metal flakes and ultraviolet-luminescent pigments such that the object is almost entirely covered by a combination of reflective metal flakes and ultraviolet-luminescent pigments. Further, the concentration of the reflective metal flakes relative to the concentration of the ultraviolet-luminescent pigment in a composition described herein should be such that the combination provides the composition, or an object painted with the composition, with metallic and reflective qualities when illuminated with ultraviolet light.

For example, if mixing a first composition comprising reflective metal flakes with a second composition comprising ultraviolet-luminescent paint results in too diluted a concentration of reflective metal flakes, the resulting composition, and any object painted with the resulting composition, may not have metallic or reflective qualities under either or both incandescent or ultraviolet light, or may have uneven metallic and reflective qualities, particularly if the paint medium is clear. Similarly, a resulting composition wherein the ultraviolet-luminescent pigment is too dilute will not provide the resulting composition, or an object painted with the resulting composition, with metallic and reflective qualities when illuminated with ultraviolet light.

Mixing most currently available compositions having ultraviolet-luminescent pigments with most currently available compositions having reflective metal flakes often results in a composition with too diluted a concentration of reflective metal flakes and/or too diluted a concentration of ultraviolet-luminescent pigments. This is believed to be due to the low concentrations or strengths of most currently available compositions having ultraviolet-luminescent pigments or reflective metal flakes. However, as described in Example 1, below, a composition comprising ultraviolet-luminescent pigments at a high concentration or strength may be added at about 0.01% or about 0.04% by weight (based on total weight) to a composition comprising reflective metal flakes to result in a composition described herein. Accordingly, particularly useful compositions comprising ultraviolet-luminescent pigments are compositions having ultraviolet-luminescent pigments in sufficient concentration or with sufficient strength such that it may be about 0.001% to about 1.0% (e.g., about 0.005%, about 0.01%, about 0.05%, about 0.1%, about 0.5%) by weight the total volume of the total weight, when mixed with a composition having reflective metal flakes.

A composition described herein comprises ultraviolet-luminescent pigments. Accordingly, a composition wherein the reflective metal flakes reflect visible light emitted from either or both an incandescent light source or activated ultraviolet-luminescent pigments to provide the composition with metallic and reflective qualities should not comprise a medium that significantly inhibits the penetration of ultraviolet light. Generally, such non-inhibitive media are well-known and include, but are not limited to, water, polymeric media, etc. Polymeric media suitable for a composition described herein may comprise polyesters, acrylics, epoxies, alkyds, polyurethane, or latex. Additionally, a medium suitable for a composition described herein may include glycol ether, ethylene glycol, etc. An example of a medium suitable for a composition described herein is a water-based acrylic paint medium.

Also described herein are methods of providing an object with metallic and reflective qualities when illuminated with ultraviolet light. In one embodiment, the object is provided with metallic and reflective qualities by application of a composition described herein. Such a composition may be applied to the object in various manners, including, but not limited to, brushing, spraying, flow coating, rolling, or dipping. The composition may then be allowed to dry, e.g., the paint medium may be allowed to evaporate at ambient temperature or by force drying via infrared heating. Additionally, an object provided with metallic and reflective qualities according to a method described herein may be further provided with a high gloss finish, e.g., via application of a clear coat that does not inhibit the penetration of incandescent or ultraviolet lights.

Accordingly, also described herein are objects with metallic and reflective qualities when illuminated with ultraviolet light comprising a layer of reflective metal flakes and ultraviolet-luminescent pigments, wherein the reflective metal flakes reflect visible light emitted from either or both an incandescent light source or activated ultraviolet-luminescent pigments to provide the object with metallic and reflective qualities. By "object" is meant anything that is visible or tangible and is relatively stable in form. For instance, an object may be a vehicle, an architectural feature, a scene feature (e.g., a water effect), a painting that portrays at least one object with metallic and reflective qualities (e.g., water, a mirror, glass, etc), or other articles.

An object as described herein may have a variety of textures. However, it is well-known that the amount of reflection (mirror-like effects) that may be provided to an object is related to the smoothness and regularity of the surface of the object. Visible light projected onto a smooth and regular surface reflects off the surface at highly uniform, discrete angles resulting in a brilliant and lustrous appearance analogous to smooth polished metals or mirrors. Light striking an irregular surface is reflected at odd, non-uniform angles resulting in metallic and reflective qualities that may be somewhat dulled.

Visible light emitted directly from an ultraviolet-luminescent pigment will have a different appearance to the naked eye compared to visible light reflected from a reflective metal flake. Additionally, visible light reflected from the reflective metal flakes will appear differently to the naked eye depending on whether the visible light is emitted from an incandescent light source or from an activated ultraviolet-luminescent pigment. Visible light emitted directly from an ultraviolet-luminescent pigment will provide a "glowing" effect that will be the color of the visible light emitted from an activated ultraviolet-luminescent pigment. Visible light emitted from an external light source and reflected off of a reflective metal flake will provide a metallic and reflective effect based solely on the reflective metal flake. Visible light emitted from an activated ultraviolet-luminescent pigment and reflected off of a reflective metal flake will provide a metallic, reflective, and glowing effect that will be based on the reflective metal flake and the color of the light emitted from an activated ultraviolet-luminescent pigment. Accordingly, applying a composition described herein to an object also provides color-shifting qualities to the object depending on the light source(s) used, in addition to the metallic and reflective qualities described above.

All references, including patents and patent applications, cited herein are incorporated herein in their entireties.

EXAMPLES

Example 1

Preparation of a Paint Composition Comprising Reflective Metal Flakes and Ultraviolet-luminescent Pigments and Application to an Object To prepare a paint composition comprising reflective metal flakes and ultraviolet-luminescent pigments, metallic silver paint (Product No. 4332, AUTO-AIR COLORS™, East Granby Conn.) was combined with ClearColour—Blue (Product No. 6650; Rosco, Stamford, Conn.), such that ClearColour—Blue was 0.01% or 0.04% by weight based on the total weight of the paint composition.

An object was prepared following standard practices and procedures for properly preparing surfaces for the application of traditional water-based latex paint. The surface of the object was sanded free of any glossy or clear coated surfaces and primed overnight.

The paint composition was spray applied to the primed object, and allowed to dry. To provide the object with a high gloss finish, a non-UV-inhibitive clear coat was applied on top of the paint layer.

When the painted object was illuminated with incandescent light, the object was provided with a silver metallic and reflective quality. When the painted object was illuminated with ultraviolet light, the object was provided with a blue-silver metallic, reflective and glowing quality. When the painted object was illuminated simultaneously with ultraviolet light and incandescent light, the object was provided with a blue-silver metallic, reflective and glowing quality. Additionally, the value of the silver or blue-silver colors were dependent on the brightness of the incandescent or ultraviolet light, respectively, where a higher value in color was provided with a brighter light source.

What is claimed is:

1. A method of preparing a paint composition comprising mixing a first composition comprising reflective metal flakes with a second composition comprising ultraviolet-luminescent pigments to provide the paint composition with metallic and reflective qualities, wherein the paint composition maintains a particular color dependent upon visible light emitted from an external source, visible light emitted from activated ultra-violet luminescent pigments and light reflected from the reflective metal flakes.

2. The method of claim 1, wherein the first composition comprises mica particles.

3. The method of claim 2, wherein the second composition comprises blue ultraviolet-luminescent pigments at about 0.001% to about 1.0% by weight based on the total weight of the paint composition.

4. The method of claim 3, wherein the second composition is about 0.01% by weight based on the total weight of the paint composition.

5. The method of claim 3, wherein the second composition is about 0.04% by weight based on the total weight of the paint composition.

6. A composition comprising
reflective metal flakes, and
ultraviolet-luminescent pigments,
wherein the reflective metal flakes reflect visible light emitted from either or both an incandescent light source or activated ultraviolet-luminescent pigments to provide the composition with metallic and reflective qualities, wherein the composition maintains a singular color dependent on the visible light emitted from the incandescent light source, activated ultraviolet-luminescent pigments and light reflected off the reflective metal flakes.

7. The composition of claim 6, wherein, the reflective metal flakes include mica particles.

8. The composition of claim 7, wherein the ultraviolet-luminescent pigments are a color selected from the group consisting of yellow, green, red, blue, and black.

9. The composition of claim 8, further comprising red iron oxide, aluminum, titanium dioxide, hydroxyethylcellulose, carbon black pigment, non-formaldehyde releasing preservative and surfactants.

10. The composition of claim 6, comprising
a water-based acrylic medium having reflective metal flakes, and
a water-based medium having ultraviolet-luminescent pigments,
wherein the water-based medium having ultraviolet-luminescent pigment is about 0.001% to about 1.0% by weight based on the total weight of the composition.

11. The composition of claim 10, wherein the water-based medium having ultraviolet-luminescent pigments is about 0.01% by weight based on the total weight of the composition.

12. The composition of claim 10, wherein the water-based medium having ultraviolet-luminescent pigments is about 0.04% by weight based on the total weight of the composition.

13. The composition of claim 10, wherein the water-based medium having ultraviolet-luminescent pigments further comprises glycol ether and ethylene glycol.

14. The composition of claim 11, wherein the reflective metal flakes include mica particles, wherein the ultraviolet-luminescent pigments are blue, and wherein the composition further comprises glycol ether, ethylene glycol, red iron oxide, aluminum, titanium dioxide, hydroxyethylcellulose, carbon black pigment, non-formaldehyde releasing preservative and surfactants.

15. The composition of claim 12, wherein the reflective metal flakes include mica particles, wherein the ultraviolet-luminescent pigments are blue, and wherein the composition further comprises glycol ether, ethylene glycol, red iron oxide, aluminum, titanium dioxide, hydroxyethylcellulose, carbon black pigment, non-formaldehyde releasing preservative and surfactants.

16. The composition of claim 6, wherein the reflective metal flakes reflect light from both an incandescent light source and the ultraviolet-luminescent pigments.

17. The composition of claim 6, wherein the first and second compositions are dry powder compositions.

18. The method of claim 1, wherein the first composition is a dry powder and the second composition is a paint.

19. The method of claim 1, wherein the first and second compositions are both liquid paints.

20. A method of illuminating an object comprising:
preparing a paint composition according to the method of claim 1;
applying the paint composition to an object;
applying a clear coat layer to over the paint composition; and
illuminating the painted object with at least one of an incandescent light source and an ultraviolet light source.

* * * * *